United States Patent
Dötsch et al.

(10) Patent No.: US 11,503,513 B2
(45) Date of Patent: Nov. 15, 2022

(54) HANDOVER IMPROVEMENT FOR AIR-TO-GROUND SYSTEM

(71) Applicant: NOKIA TECHNOLOGIES OY, Espoo (FI)

(72) Inventors: Uwe Dötsch, Freudental (DE); Michael Ohm, Stuttgart (DE)

(73) Assignee: SKYFIVE AG, Taufkirchen (DE)

( * ) Notice: Subject to any disclaimer, the term of this patent is extended or adjusted under 35 U.S.C. 154(b) by 0 days.

(21) Appl. No.: 16/646,380

(22) PCT Filed: Sep. 20, 2018

(86) PCT No.: PCT/US2018/051961
§ 371 (c)(1),
(2) Date: Mar. 11, 2020

(87) PCT Pub. No.: WO2019/060551
PCT Pub. Date: Mar. 28, 2019

(65) Prior Publication Data
US 2020/0275324 A1    Aug. 27, 2020

Related U.S. Application Data

(60) Provisional application No. 62/561,372, filed on Sep. 21, 2017.

(51) Int. Cl.
*H04W 36/00* (2009.01)
*H04B 17/318* (2015.01)
(Continued)

(52) U.S. Cl.
CPC ...... *H04W 36/0058* (2018.08); *H04B 17/318* (2015.01); *H04L 5/0051* (2013.01); *H04W 36/32* (2013.01); *H04W 76/11* (2018.02)

(58) Field of Classification Search
CPC ..... H04W 36/08; H04W 48/18; H04W 48/20; H04W 36/0016; H04W 36/0058;
(Continued)

(56) References Cited

U.S. PATENT DOCUMENTS

| 2006/0166671 A1* | 7/2006 | Rajkotia | H04W 36/32 455/436 |
| 2013/0150054 A1* | 6/2013 | Axmon | H04W 36/32 455/440 |

(Continued)

FOREIGN PATENT DOCUMENTS

| CN | 101198175 A | 6/2008 |
| CN | 101631351 A | 1/2010 |

(Continued)

OTHER PUBLICATIONS

"LTE Unmmanned Aircraft Systems", Qualcomm, May 12, 2017, 65 pages. (Year: 2017).*

(Continued)

*Primary Examiner* — Quoc Thai N Vu
(74) *Attorney, Agent, or Firm* — Squire Patton Boggs (US) LLP

(57) ABSTRACT

Systems, methods, apparatuses, and computer program products for handover (HO) in long term evolution (LTE) air-to-ground (A2G) networks are provided. One method may include determining, by a terminal associated with an air-to-ground network, a distance from the terminal to at least one cell of the air-to-ground network. When the distance is less than a maximum distance limit, the method may comprise including at least one of an identity of the at least one cell, a signal strength of the at least one cell, or the distance, in a measurement report that is transmitted to the network.

11 Claims, 3 Drawing Sheets

(51) Int. Cl.
*H04W 76/11* (2018.01)
*H04L 5/00* (2006.01)
*H04W 36/32* (2009.01)

(58) Field of Classification Search
CPC . H04W 36/0085; H04W 36/14; H04W 36/32; H04W 4/48; H04W 76/11; H04B 7/18506; H04B 17/318; H04L 5/0051; B64C 39/024
See application file for complete search history.

(56) References Cited

U.S. PATENT DOCUMENTS

| | | | |
|---|---|---|---|
| 2014/0370899 A1* | 12/2014 | Hole | H04W 36/0094 455/437 |
| 2015/0105071 A1 | 4/2015 | Yamine et al. | |
| 2016/0014657 A1 | 1/2016 | Le et al. | |
| 2018/0083692 A1* | 3/2018 | Miranda | H04W 48/20 |

FOREIGN PATENT DOCUMENTS

| | | |
|---|---|---|
| CN | 101848485 A | 9/2010 |
| CN | 101884237 A | 11/2010 |
| CN | 102204330 A | 9/2011 |
| CN | 102217372 A | 10/2011 |
| CN | 102892163 A | 1/2013 |
| CN | 102938670 A | 2/2013 |
| CN | 104486814 A | 4/2015 |
| CN | 104919651 A | 9/2015 |

OTHER PUBLICATIONS

International Search Report and Written Opinion dated Nov. 23, 2018 corresponding to International Patent Application No. PCT/US2018/051961.
First Examination Report issued in corresponding Indian Patent Application No. 202017010972 dated Jun. 21, 2021.
First Office Action issued in corresponding Chinese Patent Application No. 201880061358.1 dated Jul. 1, 2021, with English summary thereof.
Rejection Decision issued in corresponding Chinese Patent Application No. 201880061358.1 dated Feb. 22, 2022, with English summary thereof.

\* cited by examiner

HANDOVER IMPROVEMENT FOR AIR-TO-GROUND SYSTEM

CROSS REFERENCE TO RELATED APPLICATIONS

This application claims priority from U.S. Provisional Application No. 62/561,372, filed on Sep. 21, 2017. The entire contents of this earlier filed application are hereby incorporated by reference in their entirety.

BACKGROUND

Field

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio (NR) access technology. Some embodiments may generally relate to LTE air-to-ground (A2G) systems, for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity (DC).

Long Term Evolution (LTE) or E-UTRAN improves efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation or 5G Node B (gNB).

SUMMARY

One embodiment is directed to a method that may include determining, by aircraft OBE associated with an A2G network, a distance from the OBE to at least one cell. When the distance is less than a maximum distance limit, including an identity of the at least one cell, a signal strength of the at least one cell, and the distance in a measurement report that is transmitted to the network.

Another embodiment is directed to an apparatus that may include at least one processor and at least one memory including computer program code. The apparatus may be associated with an A2G network. The at least one memory and the computer program code may be configured, with the at least one processor, to cause the apparatus at least to determine a distance from the apparatus to at least one cell. When the distance is less than a maximum distance limit, the at least one memory and the computer program code may be configured, with the at least one processor, to cause the apparatus at least to include an identity of the at least one cell, a signal strength of the at least one cell, and the distance in a measurement report that is transmitted to the network.

Another embodiment is directed to a method that may include receiving, by a network node of an A2G network, a measurement report from a terminal or OBE of an aircraft. In an embodiment, the measurement report may include the identity, signal strength, and distance from the terminal of cells of the A2G network as measured by the terminal. According to one embodiment, the measurement report may include only the information for cells that are located less than a maximum distance limit from the terminal. In certain embodiments, the method may also include comparing the signal strength of the cells included in the measurement report, and triggering handover of the terminal to the cell with the highest signal strength.

Another embodiment is directed to an apparatus that may include at least one processor and at least one memory including computer program code. The apparatus may be associated with an A2G network. The at least one memory and the computer program code may be configured, with the at least one processor, to cause the apparatus at least to receive a measurement report from a terminal or OBE of an aircraft. In an embodiment, the measurement report may include the identity, signal strength, and distance from the terminal of cells of the A2G network as measured by the terminal. According to one embodiment, the measurement report may include only the information for cells that are located less than a maximum distance limit from the terminal. In certain embodiments, the at least one memory and the computer program code may be configured, with the at least one processor, to cause the apparatus at least to compare the signal strength of the cells included in the measurement report, and to trigger handover of the terminal to the cell with the highest signal strength.

BRIEF DESCRIPTION OF THE DRAWINGS

For proper understanding of the invention, reference should be made to the accompanying drawings, wherein.

DETAILED DESCRIPTION

Figure 1:
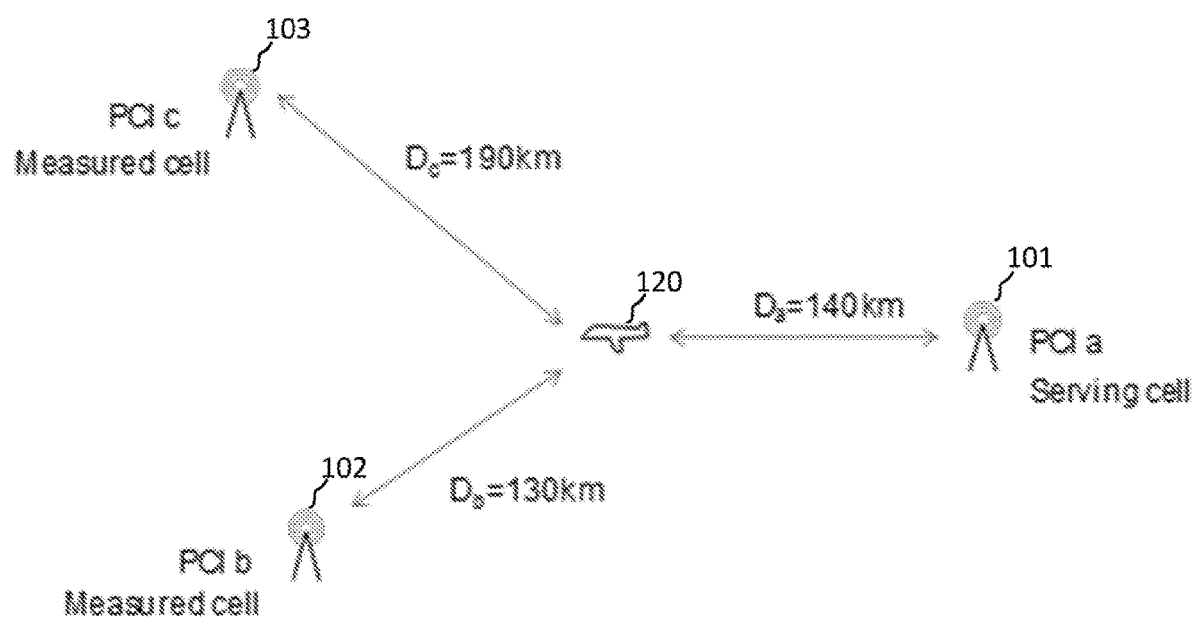
FIG. 1 illustrates a system, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to LTE air-to-ground (A2G) systems, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

LTE A2G systems provide broadband connectivity to aircraft. LTE A2G leverages standardized LTE technology and implements enhancements to cope with the high-speed and large-cell scenario involved in providing real-time and broadband communications to aircraft in flight.

LTE A2G is enhanced such that high aircraft speeds, for example up to 1200 km/h, and large cells, for example up to 150 km, are supported. The current 150 km distance limit between the base station and the aircraft may be achieved with a modified RACH procedure (standard LTE allows only 100 km). However, beyond the distance limit, which is currently 150 km, no attach to a base station is possible. It should be noted that, in the future, the distance limit may change or increase so that higher cell radii may be supported. Embodiments of the present disclosure may be applicable to any distance limit and are not limited to the specific examples discussed herein.

The LTE A2G terminal in the aircraft, which may also be referred to as onboard equipment (OBE) performs handover (HO) measurements according to the LTE standard. Due to the line-of-sight propagation conditions in the A2G scenario in combination with the base station and the aircraft antenna pattern, it may occur that the measurements lead to higher (better) received signal strengths (RSRP) for distant cells beyond the 150 km maximum range compared to closer cells within the 150 km range.

Based on the measurement reports, the network may trigger a handover of the OBE to a cell exceeding the 150 km maximum distance. This handover will fail, as no attach is possible beyond 150 km. The OBE also cannot re-attach to the network, as it will continue to try to re-connect to the cell exceeding the 150 km maximum distance, since this cell produces the best measurement result.

This situation is unique for LTE A2G and does not exist in terrestrial LTE networks, because the network deployments never include such large cells. Even if they did include such large cells, due to the non-line-of-sight conditions in large-cell terrestrial network, the distant cells would be much more attenuated than the closer cells.

Currently, the only resolution of this situation is to wait for some time until the radio conditions have changed, and the closer cells again lead to better HO measurement results. This situation is very inconvenient, as the service for the crew and all the passengers inside the aircraft would remain unavailable. Flight tests have shown that such outages can have a duration of few minutes.

Therefore, certain embodiments provide a system in which the OBE may be configured to delete measurement reports of cells that are located beyond the 150 km distance limit before the measurement reports are sent to the network. Based on that, the LTE A2G network can fully base its HO decisions on the measurement reports received from the OBE. The OBE may need to have means to determine the distance to the cells that it measures. Certain embodiments may provide at least two potential ways to determine the distance, as will be discussed in detail below.

It is noted that implementing a method for avoiding the problem described above in the OBE instead of the base station, has the benefit that it is easier to implement because the reference signal received power (RSRP) and the location measurements are known by the OBE and no additional signaling to the network is necessary. This also allows for continuing use of the LTE base station software without modification, which also has been the design rationale for the high-speed and large-cell enhancements.

FIG. 1 illustrates an example of a system in which an aircraft with OBE is in HO situation, according to an embodiment. In the example of FIG. 1, the OBE of aircraft 120 is connected to a cell 101 with physical cell identity (PCI) a. The aircraft 120 is flying away from this cell 101 and needs to handover to another cell before the maximum distance is exceeded. The OBE may measure the RSRP of two cells: one cell 102 with PCI b at a distance of $D_b$=130 km, and a second cell 103 with PCI c at a distance of $D_c$=190 km.

In the situation depicted in FIG. 1, the OBE has the measurement information shown in Table 1 and reports the information it to the network. For the sake of explanation, it may be assumed that the OBE stores a table with the measurement information of Table 1.

TABLE 1

| Line No | PCI | RSRP |
|---|---|---|
| 1 | PCI c | RSRP c |
| 2 | PCI b | RSRP b |

As mentioned above, it may occur, for example due to the base station antenna pattern or the OBE antenna pattern, that RSRP c>RSRP b, although the cell with PCI c is significantly farther away than the cell with PCI b. Based on standard procedures, the network would trigger a handover to the cell with PCI c, since RSRP c>RSRP b. However, this handover will fail, as the distance of the cell with PCI c is beyond the maximum distance.

In one embodiment of the present disclosure, the OBE may determine the distances $D_i$ to the measured cells. For example, the OBE may then have the measurement information shown in Table 2.

TABLE 2

| Line No | PCI | RSRP | D |
|---|---|---|---|
| 1 | PCI c | RSRP c | $D_c$ |
| 2 | PCI b | RSRP b | $D_b$ |

In an embodiment, before sending measurement reports to the network, the OBE may delete all lines with cells exceeding the distance limit $D_{max}$, i.e., $D_i$>$D_{max}$. In the example shown in FIG. 1, the measurement information for the cell with PCI c includes $D_c$=190 km, which is greater than $D_{max}$=150 km. Since $D_c$>$D_{max}$, the OBE may delete the measurement information for PCI c as shown in Table 3 below.

TABLE 3

| Line No | PCI | RSRP | D |
|---|---|---|---|
| 2 | PCI b | RSRP b | $D_b$ |

In this example, this leads to the table of measurement reports to be transmitted by the OBE to the network as shown in Table 4 below.

TABLE 4

| Line No | PCI | RSRP |
|---|---|---|
| 1 | PCI b | RSRP b |

Based on the measurement report received from the OBE, the network cannot initiate a handover the cell with PCI c, as it is not even aware that the OBE can measure this cell. Then, if the handover conditions are reached, the network will trigger a handover to the cell with PCI b, which is within the allowed distance of the OBE.

Embodiments described herein may provide several methods to determine the distance to the measured cells by the OBE. In one embodiment, the OBE may determine the distance to the each of the cells by evaluating the timing of the measured cells. As an example, taking the system depicted in FIG. 1 and assuming the network is fully synchronized such that all the base stations have the same signal timing, the OBE may calculate the distance to the serving cell 101 from a timing advance (TA) value provided by the serving cell 101 to the OBE as part of standard LTE procedures. The TA may be in direct relation to the distance $D_a$ between aircraft 120 and serving cell 101. The OBE may then compare the timing difference of the measured cells 102, 103 to the timing of the serving cell 101, for which it knows the TA value. The timing differences for the measured cells 102, 103 directly relate to the distance differences $\Delta D_i$ to the serving cell 101 with distance $D_a$. As such, the OBE may calculate from the TA and timing difference of (e.g., the reference symbol of the measured cell compared to the serving cell) a delta in distance, which may be referred to as $\Delta D_i$. The distances of the measured cells $D_i$ may then be obtained according to the following formula: $D_i$=$D_a$-$\Delta D_i$, where $D_i$ is a distance to a measured cell (e.g., $D_b$ or $D_c$ in FIG. 1), $D_a$ is the distance to the serving cell 101, and $\Delta D_i$ is the distance differences to the serving cell 101. For example, when calculating the distance $D_b$ to cell b in the example of FIG. 1, $\Delta D_i$ represents the difference in distance between the aircraft 120 and the serving cell 101 (i.e., 140 km in the example of FIG. 1) and the aircraft 120 and cell B (i.e., 130 km in the example of FIG. 1), which is 10 km (140 km−130 km) according to the example of FIG. 1. With knowledge of $\Delta D_i$ (i.e., 10 km in this example), the OBE can calculate the absolute distance to cell b according to the above-noted formula ($D_i$=$D_a$−$\Delta D_i$).

An advantage of determining the distance to the each of the cells by using the timing of the cells is that the system fully relies on measurements performed by the OBE. In other words, the system would not need to rely on external information, which could be inaccurate or outdated. In addition, while this method relies on having a synchronized network, typical LTE A2G network implementations have a global positioning system (GPS) receiver installed on all base stations, and it is therefore straight-forward to implement a synchronized network. Loss of GPS signal will immediately be detected by the network operations through standard network alarms, and corrective action can be triggered to resolve the failure within a defined time frame, during which the base station timing drift is negligible.

In another embodiment, the OBE may determine the distance to each of the cells by calculating the distance based on known positions. For example, in this embodiment, the OBE may obtain knowledge of its own position by, e.g., reading the position information distributed on the aircraft's data bus, such as an avionics or aeronautical radio (e.g., ARINC 429) bus. The OBE may also obtain knowledge of the position of all of the cells in the network. In one example, there may be a network position client software in the OBE that connects to a network position server software in the network in defined time intervals, such as once (or more times) a day. The network position server may include or store a table of all the cell locations. Upon connection, the network position client retrieves the positions of all cells in the network from the network position server. In an A2G network, the number of cells is relatively small compared to a typical terrestrial LTE network. For example, in some A2G networks, approximately 300 sites are required to cover an entire continent such as Europe. As a result, the amount of data to be retrieved is rather limited, which makes it feasible for the OBE to obtain the positions of all cells in the A2G network. With the knowledge of its own position and the knowledge of all cell positions, the OBE may then geometrically calculate the distances $D_i$ to all of the measured cells. An advantage of determining the distance to the each of the cells by calculating the distance based on known positions is that this method does not rely on a synchronized network.

Figure 2A:
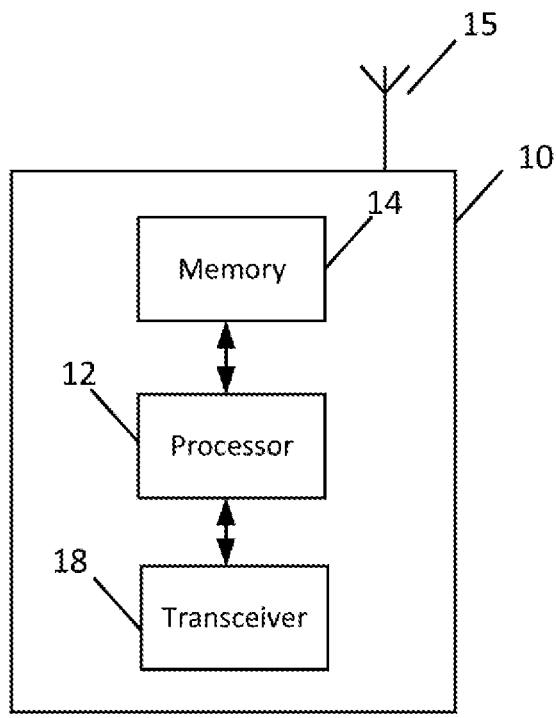
FIG. 2a illustrates a block diagram of an apparatus, according to one embodiment.

FIG. 2a illustrates an example of an apparatus 10 according to an embodiment. In an embodiment, apparatus 10 may be a node or element in a communications network or associated with such a network, such as a terminal, UE, OBE, mobile equipment (ME), mobile station, mobile device, stationary device, IoT device, or other device. As described herein, UE may alternatively be referred to as, for example, OBE, a mobile station, mobile equipment, mobile unit, mobile device, user device, subscriber station, wireless terminal, tablet, smart phone, IoT device or NB-IoT device, or the like. In one embodiment, apparatus 10 may be a terminal or OBE of an aircraft that is in communication or associated with a LTE A2G network, for example. It should be noted that one of ordinary skill in the art would understand that apparatus 10 may include components or features not shown in FIG. 2a.

As illustrated in FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, LTE, NB-IoT, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Apparatus 10 may further include a user interface, such as an instrument panel, monitor, graphical user interface and/or touchscreen.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a terminal or OBE of an aircraft, and may be associated or in communication with a LTE A2G network. According to certain embodiments, apparatus 10 may be controlled by memory 14 and processor 12 to perform the functions associated with any of the embodiments described herein.

In certain embodiments, apparatus 10 may be controlled by memory 14 and processor 12 to determine a distance from the apparatus 10 to one or more base stations or cells of the LTE A2G network. If the determined distance to the base station(s) or cell(s) is less than a maximum distance limit, then the identity (e.g., PCI) of the cell(s), RSRP of the cell(s), and distance to the cell(s) is included in a measurement report sent to the network.

For example, in one embodiment, apparatus 10 may be controlled by memory 14 and processor 12 to calculate the distance from apparatus 10 to each of the base stations or cells in the LTE A2G network, and/or calculate the RSRP for each of the base stations or cells. According to an embodiment, apparatus 10 may be controlled by memory 14 and processor 12 to construct a measurement report comprising the identity (e.g., PCI) of each of the cells, the RSRP for each cell, and the distance of each cell from apparatus 10. In an embodiment, apparatus 10 may then be controlled by memory 14 and processor 12 to compare the distance of each cell to a maximum distance limit, and to remove, from the measurement report, any cell that has a distance that is greater than the maximum distance limit Apparatus 10 may also be controlled by memory 14 and processor 12 to transmit the measurement report, which only includes information for cells that are located at a distance less than the maximum distance limit, to the network. In other words, the transmitted measurement report would include the identity (e.g., PCI), RSRP, and distance for all cells that are located at a distance that is less than the maximum distance limit.

In another embodiment, prior to constructing the measurement report, apparatus 10 may be controlled by memory 14 and processor 12 to calculate the distance from apparatus 10 to each of the base stations or cells in the LTE A2G network, and to compare the distance of each cell to a maximum distance limit. If the distance of the cell is less than the maximum distance limit, then apparatus 10 may be controlled by memory 14 and processor 12 to add that cell to the measurement report. If the distance of the cell is greater than the maximum distance limit, then apparatus 10 may be controlled by memory 14 and processor 12 to not include the cell in the measurement report. Apparatus 10 may then be controlled by memory 14 and processor 12 to transmit the measurement report, which was created to only include information for cells that are located at a distance less than the maximum distance limit, to the network.

In some embodiments, apparatus 10 may be controlled to determine or calculate the distance to each of the cells according to several options. In one embodiment, apparatus 10 may be controlled by memory 14 and processor 12 to determine the distance to the each of the measured cells by evaluating the timing of the measured cells. For example, in this embodiment, apparatus 10 may be controlled by memory 14 and processor 12 to calculate, from a TA value, the distance to the cell currently serving apparatus 10. Apparatus 10 may then be controlled by memory 14 and processor 12 to compare the timing difference of each of the measured cells in the network to the timing of the serving cell, for which it knows the TA value. The timing differences for the measured cells directly relate to the distance differences $\Delta D_i$ to the serving cell with distance $D_a$. The distances of the measured cells $D_i$ may then be obtained according to the following formula: $D_i = D_a - \Delta D_i$, where $D_i$ is a distance to a measured cell (e.g., $D_b$ or $D_c$ in FIG. 1), $D_a$ is the distance to the serving cell, and $\Delta D_i$ is the distance differences to the serving cell.

In another embodiment, apparatus 10 may be controlled by memory 14 and processor 12 to determine the distance to each of the measured cells by calculating the distance based on known positions. For example, in this embodiment, apparatus 10 may be controlled by memory 14 and processor 12 to obtain knowledge of its own position by, e.g., reading the position information distributed on its data bus, such as an avionics or aeronautical radio (e.g., ARINC 429) bus. Apparatus 10 may also be controlled by memory 14 and processor 12 to obtain knowledge of the position of all of the cells in the network, for example, from a network position server that stores a table of all the cell locations. With the knowledge of its own position and the knowledge of all cell positions, apparatus 10 may then be controlled by memory 14 and processor 12 to geometrically calculate the distances $D_i$ to all of the measured cells.

Figure 2B:
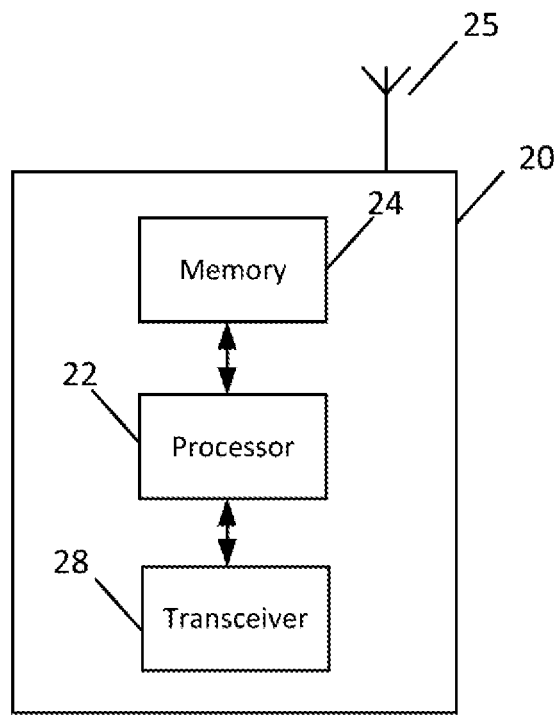
FIG. 2b illustrates a block diagram of an apparatus, according to another embodiment.

FIG. 2b illustrates an example of an apparatus 20 according to another embodiment. In an embodiment, apparatus 20 may be a node, host, or server in a communications network or serving such a network. For example, apparatus 20 may be a base station, a Node B, an evolved Node B (eNB), 5G Node B or access point, next generation Node B (NG-NB or gNB), or WLAN access point associated with a radio access network, such as a GSM network, LTE network, 5G or NR. In an embodiment, apparatus 20 may be a base station or eNB of a LTE A2G network.

It should be understood that apparatus 20 may be comprised of an edge cloud server as a distributed computing system where the server and the radio node may be stand-alone apparatuses communicating with each other via a radio path or via a wired connection, or they may be located in a same entity communicating via a wired connection.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 2b.

As illustrated in FIG. 2b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a base station, node B, or eNB, for example, of a LTE A2G network. According to certain embodiments, apparatus 20 may be controlled by memory 24 and processor 22 to perform the functions associated with any of the embodiments described herein. For example, in some embodiments, apparatus 20 may be configured to perform one or more of the processes depicted in any of the flow charts or system diagrams described herein.

According to one embodiment, apparatus 20 may be controlled by memory 24 and processor 22 to receive a measurement report from a terminal or OBE of an aircraft. In an embodiment, the measurement report may include the identity (e.g., PCI), RSRP, and distance from the OBE of cells of the A2G network as measured by the OBE. According to one embodiment, the measurement report includes only the information for cells that are located less than a maximum distance limit from the OBE. In certain embodiments, apparatus 20 may then be controlled by memory 24 and processor 22 to compare the RSRPs of the cells included in the measurement report, and to trigger HO of the OBE to the cell with the highest RSRP.

Figure 3A:
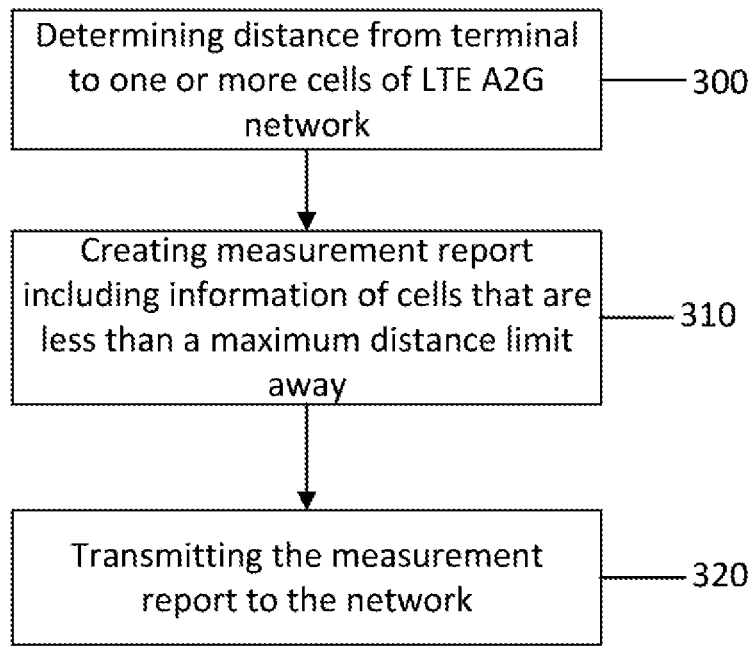
FIG. 3a illustrates an example flow diagram of a method, according to an embodiment.

FIG. 3a illustrates an example flow diagram of a method, according to one example embodiment. The method may be performed by a network node, such as a terminal or OBE of an aircraft, for example. The method of FIG. 3a may include, at 300, determining a distance from the terminal to one or more base stations or cells of the LTE A2G network. In an embodiment, the method may also include calculating the RSRP for each of the base stations or cells. If the determined distance to the base station(s) or cell(s) is less than a maximum distance limit, then the method may include, at 310, creating a measurement report including the identity (e.g., PCI) of the cell(s), RSRP of the cell(s), and distance to the cell(s).

In another embodiment, the creating 310 may include creating a measurement report including information for all of the measured cells, comparing the distance of each cell to the maximum distance limit, and removing, from the measurement report, any cell that has a distance that is greater than the maximum distance limit. The method may then include, at 320, transmitting the measurement report, which only includes information for cells that are located at a distance less than the maximum distance limit, to the network. As a result, the transmitted measurement report would include the identity (e.g., PCI), RSRP, and distance for all cells that are located at a distance that is less than the maximum distance limit.

In one embodiment, the determining 300 may include determining the distance to the each of the measured cells by evaluating the timing of the measured cells. For example, in this embodiment, the determining 300 may include calculating, from a TA value, the distance to the cell currently serving the terminal, comparing the timing difference of each of the measured cells in the network to the timing of the serving cell (for which it knows the TA value), and obtaining distances of the measured cells $D_i$ according to the following formula: $D_i = D_a - \Delta D_i$, where $D_i$ is a distance to a measured cell (e.g., $D_b$ or $D_c$ in FIG. 1), $D_a$ is the distance to the serving cell, and $\Delta D_i$ is the distance differences to the serving cell.

In another embodiment, the determining 300 may include determining the distance to each of the measured cells by calculating the distance based on known positions. For example, in this embodiment, the determining 300 may include the terminal obtaining knowledge of its own position, obtaining knowledge of the position of all of the cells in the network, and using the knowledge of its own position and the knowledge of all cell positions to geometrically calculate the distances $D_i$ to all of the measured cells.

Figure 3B:
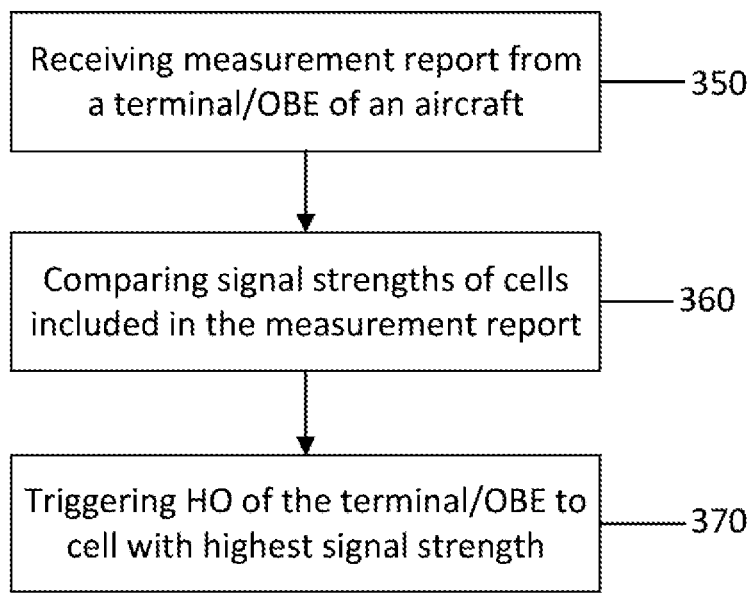
FIG. 3b illustrates an example flow diagram of a method, according to another embodiment.

FIG. 3b illustrates an example flow diagram of a method, according to one example embodiment. The method may be performed by a network node, such as a base station, eNB, gNB, or access node of a LTE A2G network, for example. The method of FIG. 3b may include, at 350, receiving a measurement report from a terminal or OBE of an aircraft. In an embodiment, the measurement report may include the identity (e.g., PCI), RSRP, and distance from the terminal of cells of the A2G network as measured by the OBE. According to one embodiment, the measurement report may include only the information for cells that are located less than a maximum distance limit from the OBE. In certain embodiments, the method may also include, at 360, comparing the RSRPs of the cells included in the measurement report. The method may then include, at 370, triggering HO of the terminal to the cell with the highest RSRP.

In view of the above, embodiments of the invention provide several technical effects and/or improvements and/or advantages. For example, certain embodiments improve HO in A2G networks. One advantage is that service outages due to non-successful HO or attach attempts to cells beyond a distance limit are avoided, and that the overall performance and user experience significantly increases. Another advantage is that standard HO methods only based on measurement reports sent from the OBE to the network can be maintained in the implemented network.

Hence, certain embodiments can improve system performance of A2G networks. As a result, certain embodiments can improve performance and throughput of devices and network nodes including, for example, base stations, eNBs, gNBs, UE, terminals and/or OBE. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of example embodiments, reference should be made to the appended claims.

We claim:

1. An apparatus, comprising:
   at least one processor; and
   at least one memory comprising computer program code,
   the at least one memory and computer program code configured, with the at least one processor, to cause the apparatus at least to
      determine a distance from the apparatus to at least one cell of an air-to-ground network;
   create a measurement report to include information for measured cells;
   compare the distance of each of the measured cells to a maximum distance limit allowed between the apparatus and the at least one cell of the air-to-ground network; and
   remove, from the measurement report, any of the measured cells that have a distance that is greater than the maximum distance limit; and
   when the distance from the apparatus to the at least one cell of the air-to-ground network is less than the maximum distance limit, the measurement report that is transmitted to the air-to-ground network comprises at least one of an identity of the at least one cell, a signal strength of the at least one cell, or the distance from the apparatus to the at least one cell of the air-to-ground network,
   wherein the apparatus comprises a terminal associated with an air-to-ground network.

2. The apparatus according to claim 1, wherein the at least one memory and computer program code are further configured, with the at least one processor, to cause the apparatus at least to calculate reference signal received power (RSRP) for the at least one cell.

3. The apparatus according to claim 1, wherein the at least one memory and computer program code are further configured, with the at least one processor, to cause the apparatus at least to transmit, to the network, the measurement report that includes information for cells that are located at a distance less than the maximum distance limit.

4. The apparatus according to claim 1, wherein the at least one memory and computer program code are further configured, with the at least one processor, to cause the apparatus at least to determine the distance to the at least one cell by evaluating a timing of the at least one cell.

5. The apparatus according to claim 1, wherein the at least one memory and computer program code are further configured, with the at least one processor, to cause the apparatus at least to determine the distance to the at least one cell by calculating the distance based on known positions.

6. A method, comprising:
   determining, by a terminal associated with an air-to-ground network, a distance from the terminal to at least one cell of the air-to-ground network;
   creating a measurement report to include information for measured cells;
   comparing the distance of each of the measured cells to a maximum distance limit allowed between the terminal and the at least one cell of the air-to-ground network;
   removing, from the measurement report, any of the measured cells that have a distance that is greater than the maximum distance limit; and
   when the distance from the terminal to the at least one cell of the air-to-ground network is less than the maximum distance limit, the measurement report that is transmitted to the air-to-ground network comprises at least one of an identity of the at least one cell, a signal strength of the at least one cell, or the distance from the terminal to the at least one cell of the air-to-ground network.

7. The method according to claim 6, the method further comprising calculating reference signal received power (RSRP) for the at least one cell.

8. The method according to claim 6, further comprising transmitting, to the network, the measurement report that includes information for cells that are located at a distance less than the maximum distance limit.

9. The method according to claim 6, further comprising determining the distance to the at least one cell by evaluating a timing of the at least one cell.

10. The method according to claim 6, further comprising determine the distance to the at least one cell by calculating the distance based on known positions.

11. A computer program embodied on a non-transitory computer readable medium, said computer program comprising program instructions which, when executed in hardware, cause the hardware to perform the method according to claim 6.

* * * * *